May 3, 1938.  R. B. FUNK  2,115,910
AIR CONTROL DEVICE
Filed March 16, 1936   3 Sheets-Sheet 1

CONNECTED TO THROTTLE ACTUATING MEANS

Inventor
R. B. Funk
Chas. K. Davis + Son
attys.

May 3, 1938. R. B. FUNK 2,115,910
AIR CONTROL DEVICE
Filed March 16, 1936   3 Sheets-Sheet 2
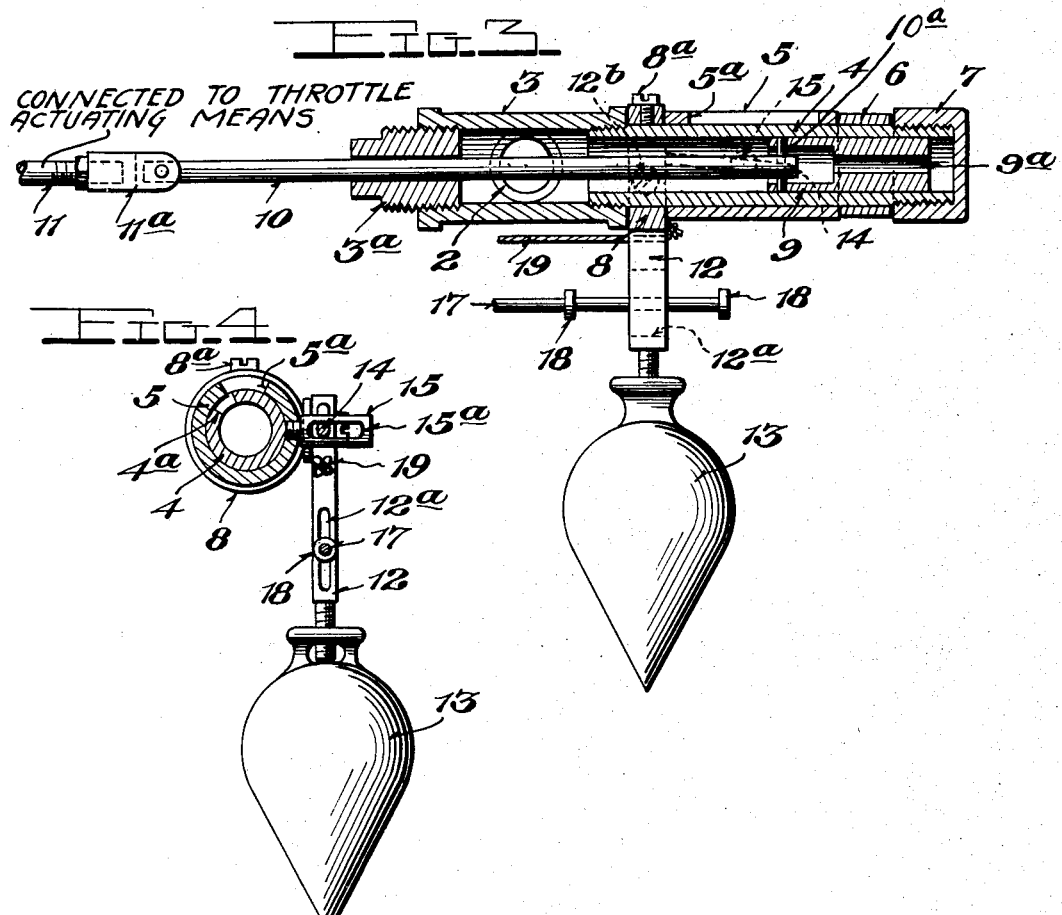
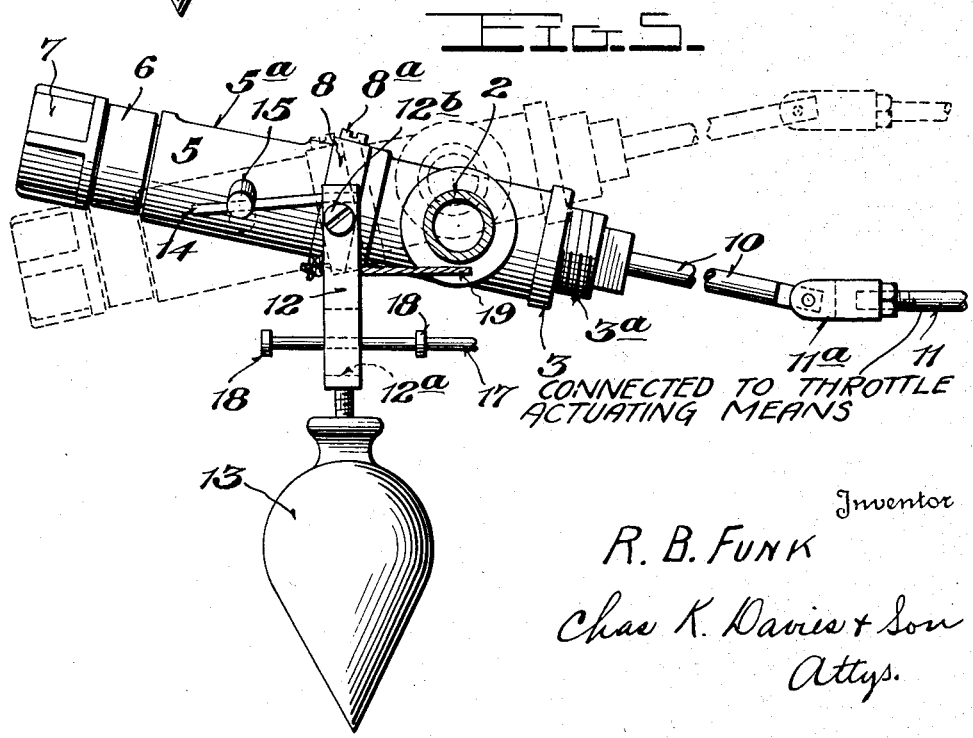
Inventor
R. B. Funk
Chas K. Davies & Son
Attys.

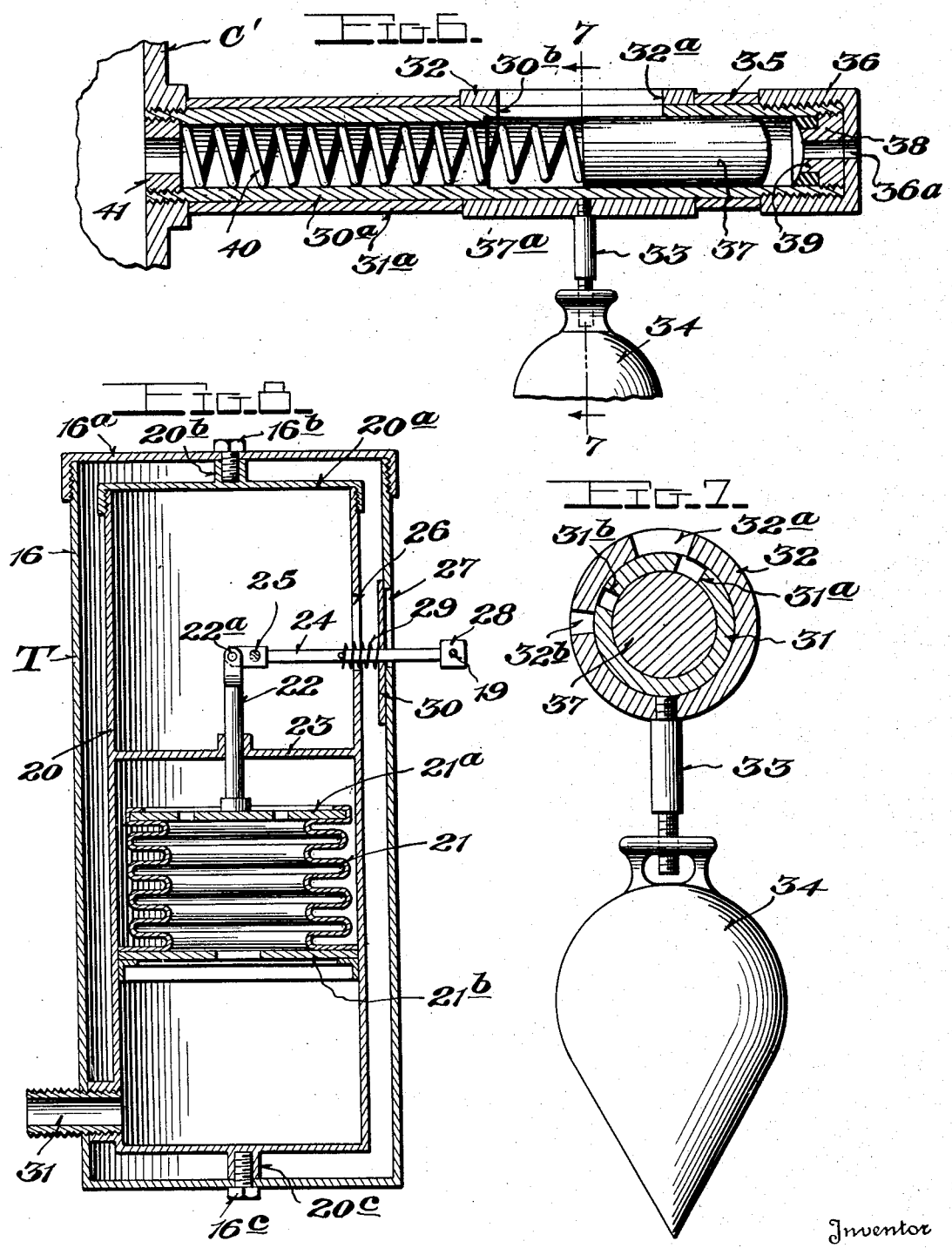

Patented May 3, 1938

2,115,910

UNITED STATES PATENT OFFICE 2,115,910

AIR CONTROL DEVICE

Rufus B. Funk, Washington, D. C.

Application March 16, 1936, Serial No. 69,226

19 Claims. (Cl. 123—119)

My present invention relates to improvements in air control devices for use in regulating and controlling the feed of air for carburetion in an internal combustion engine employed in the propulsion of automotive vehicles. The air control device of my invention is usually employed as an auxiliary attachment to the usual main valve or throttle-device, which is pedal-operated to control the feed of all air to the carburetor.

In carrying out my invention I employ a regulating valve which is open to the atmosphere to govern the capacity or volume of air available for use in the auxiliary feed control or air control device; and in addition I utilize a feed control valve, which latter valve controls the flow to the carburetor of a regulated supply or volume of air from the atmosphere.

The regulating valve for governing the capacity or volume of air from the atmosphere available for use in the control device, may be operated in various ways, as for instance, by the direct action of a gravity device or pendulum which operates in accord with the inclination of a traveling vehicle in ascending or descending a grade. The gravity-actuated device may also be actuated through the use of a thermostat subject to the influence of heat from the water-cooling system of the internal engine. And, in addition, manually operated means may be connected with the gravity actuated-device for controlling and operating the regulating valve.

To secure maximum efficiency of the fuel charges supplied to the engine under varying conditions, the air regulating valve may be set for full capacity opening during the summer for the purpose of diluting the fuel charge; while on the other hand, in winter, the range of movement of the regulating valve may be adjusted to reduce operating capacity or volume of atmospheric air available for use by the feed control valve.

The control valve for feeding the available supply of air to the carburetor may be automatically operated by suction from the engine; and the control valve may also be actuated by pedal-operated means, as the accelerator or throttle device of the engine.

The invention consists in certain novel combinations and arrangements of parts as will hereinafter be more fully set forth and claimed. In the accompanying drawings I have illustrated one complete example, with modifications, of the physical embodiment of my invention, wherein the parts are combined and arranged in accord with the best mode I have thus far devised for the practical application of the principles of my invention. It will be understood, however, that changes and alterations may be made in these exemplifying structures, within the scope of my appended claims, without departing from the principles of my invention.

Figure 3 is a vertical longitudinal sectional view of the air control device, at line 3—3 of Figure 2, with the slidable feed control valve approximately two-thirds open; and showing also in addition to the gravity actuated device for operating the regulating valve, two separate connections for operating this valve, indirectly, through the gravity-actuated device.

Figure 4 is a transverse sectional view at line 4—4 of Figure 2.

Figure 5 is a sectional view at line 5—5 of Figure 2 illustrating by full lines the position of the air control device when the automotive vehicle is on an up-grade, and by dotted lines indicating the position of the control device when the vehicle is on a down-grade.

Figure 6 is a longitudinal vertical sectional view of a modified form of the air control device, located transversely of the engine, and showing a gravity-actuated regulating valve, together with a spring-opened feed control valve which is closed, or partially closed, by suction.

Figure 7 is a transverse sectional view at line 7—7 of Figure 6.

Figure 8 is a vertical sectional view of a thermostat suitable for use in controlling the rotary regulating valve for governing the capacity or volume of air admitted from the atmosphere to the air control device.

Figure 1:
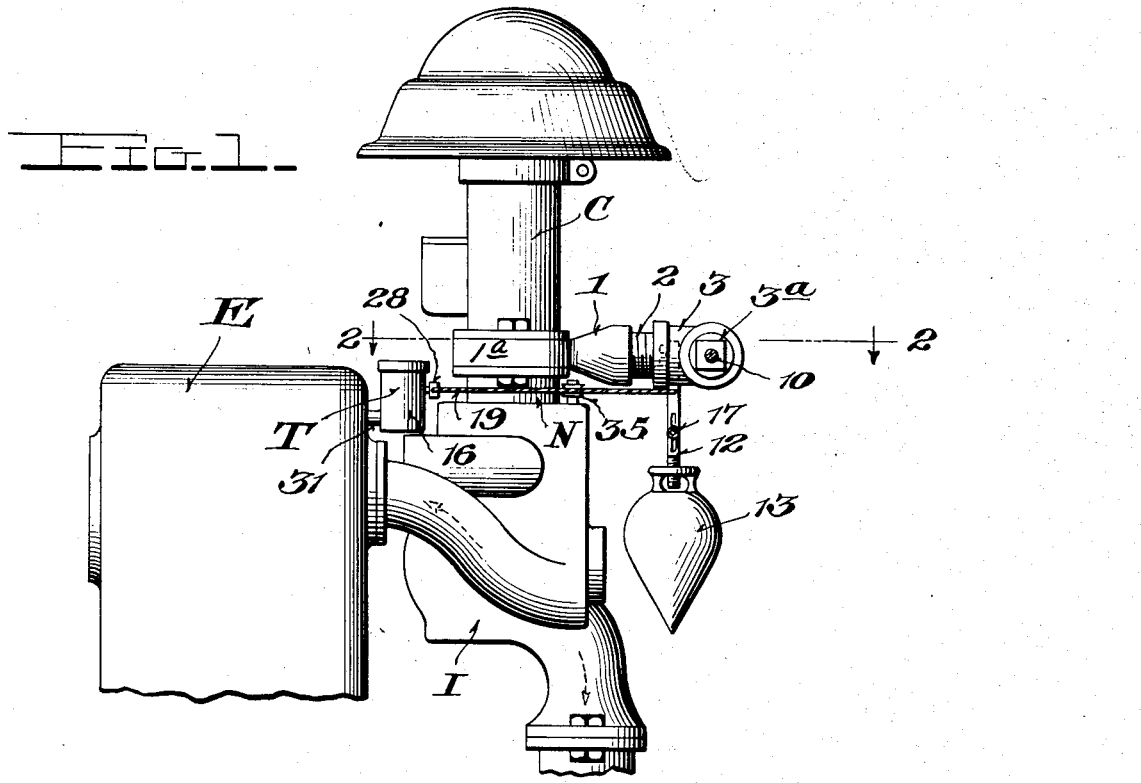
Figure 1 is a view of so much of an internal combustion engine, its carburetor, and intake manifold, as is necessary to illustrate the installation and use of my auxiliary air control device.

In the assembly view of Figure 1 I have shown a down-draft type of carburetor C to which the air control device of my invention is connected at N, which connection communicates through the intake manifold I with the cylinders of the engine E.

In all forms of the invention disclosed herein the pendulum of the bob type employed as the gravity-actuator for the regulating valve admitting air to the air control device from the atmosphere, is adapted to swing in an arc parallel with the direction of travel of the automobile or other vehicle which is equipped with the auxiliary device of my invention, and the rotary regulating valve is controlled thereby. The feed control valve which controls the supply of available air to the carbureter, is preferably a slide valve adapted to reciprocate in a plane parallel with the direction of travel of the vehicle, or in the modified form of the invention where the feed valve is automatically controlled by suction from the engine, this valve may reciprocate in a plane transversely of the line of travel of the vehicle.

Figure 2:
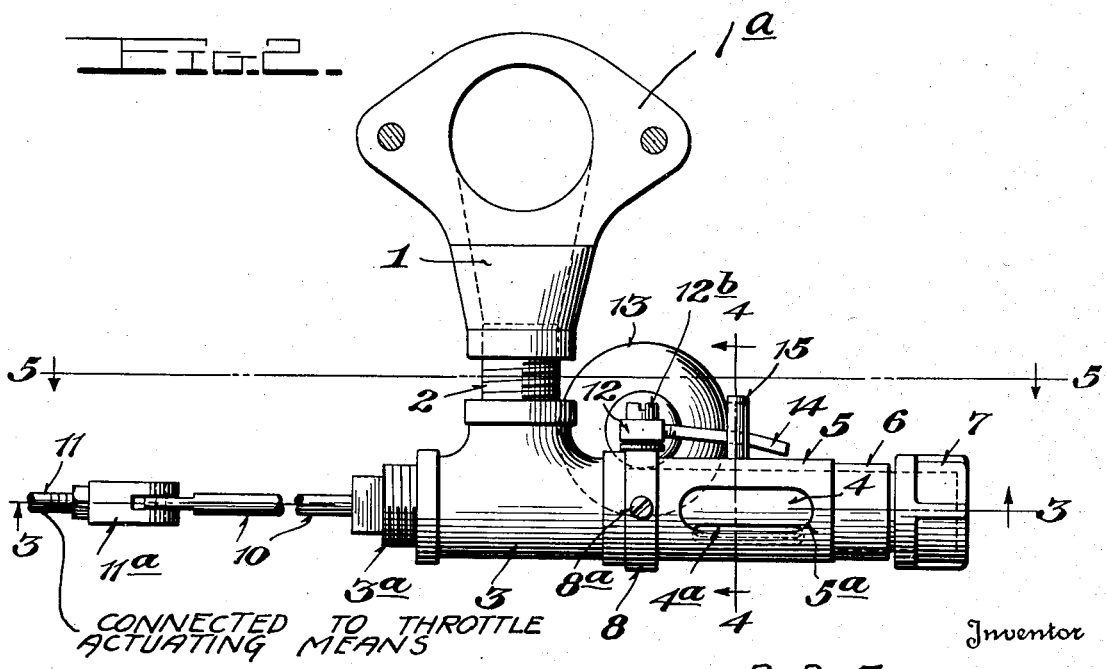
Figure 2 is an enlarged, top plan view of the device, turned at right angles to Figure 1, showing the attaching bolts in cross section, as on a line at 2—2 of Figure 1.

In Figures 1 and 2 the air control device is interposed between the intake manifold and the carbureter by means of the tubular casting 1 having a flattened, open center flange 1a which is bolted between complementary flanges, and the casting is coupled by a threaded nipple 2 with a T-connection or coupling pipe 3 having its rear end closed by a bearing plug 3a. At its front end the coupling pipe has threaded therein a cylinder 4 which forms the casing for the piston or slide valve controlling the feed of air through the cylinder, pipe 3, nipple 2 and the casting 1 to the carbureter. As best seen in Figure 2 the cylinder is fashioned with a port or elongated slot 4a extending longitudinally thereof, with which the slide valve or piston valve 9 cooperates to control the feed of air.

To provide a regulated supply of air to the feed control valve I provide an exterior rotary tubular valve 5 which is also fashioned with a longitudinal port 5a that is open to the atmosphere. This regulating valve varies the capacity or volume of air from the atmosphere that is available for use through the operation of the feed control valve 9, and the regulating valve is adapted to turn or oscillate on the cylinder or valve casing 4, a spacing collar 6 and a threaded cap 7 being employed at the front end of the valve casing to retain the regulating valve in position. Between the rear end of the rotary regulating valve and the front end of the coupling 3, a ring or collar 8 is mounted on the valve casing 5, and this ring or band is adjustable about the valve casing, a set screw 8a being mounted in the adjusting ring for impingement against the exterior face of the casing 5.

The hollow piston or slide valve which controls the feed of air in combination with the airport 4a may be operated under manual or pedal control, as for instance in combination with the accelerator pedal of the vehicle, or it may be automatically operated, as by a spring, or by suction. As indicated in Figure 3 the valve is fashioned with an air port 9a extending longitudinally thereof, which opens into the closed or capped end of the valve casing or cylinder 4 to vent, and to equalize air pressure in the valve casing, and it will be understood that the valve opens toward the right in Figure 3 where the port 4a is approximately two thirds open for admitting air through the valve casing to the carbureter. The valve is reciprocated through the use of a push rod 10 loosely coupled at 10a to the valve, and also coupled to the operating rod 11 at 11a, the operating rod extending rearwardly and being coupled in suitable manner with the accelerator operating-means.

The regulating valve, through the cooperation of its port 5a with the port 4a of the control valve casing, governs the volume or capacity of atmospheric air that is made available for use by the feed control valve, and this rotary regulating valve is operated through the use of a pendulum of the plumb bob type having an arm 12 and the bob or weight 13 suspended below the air control device. As best seen in Figure 5 the arm is pivotally suspended at 12b on the adjustable ring 8 that is fixed in adjusted position on the valve casing 5 by set screw 8a and a crank arm 14 rigid with the suspending arm 12 passes loosely through a hole in the laterally projecting pin 15 that is swivelled in relation to the regulating valve 5.

In Figure 5 it will be apparent that variations in the horizontal position of the air control device, that is rigidly mounted with relation to the engine E, through the action of gravity which influences the weight 13, will cause the regulating valve to turn to closed position as the vehicle ascends a hill, and conversely, the valve will turn toward open position as the vehicle descends the hill.

In Figure 4 it will be seen that the laterally projecting pin 15 is slotted at 15a to provide a bearing for the crank arm 14 to compensate for the variations in the swing of the respective pin and arm.

The vertically suspended or perpendicular arm 12 is slotted at 12a to receive a manual control rod 17 having at its end spaced, fixed collars 18, 18, one at each side of the arm, by means of which the range of movement of the swinging arm 12 may be regulated and sleeve valve 9 operated by hand if desired, and a minimum or a maximum movement of said valve 9 may be set.

The manual control rod 17 extends rearwardly to the dash board or instrument board of the vehicle where it is readily accessible for use by the driver, and by pushing or pulling on the rod, as desired or necessary, the collars control the range of movement of the arm 12.

Through the instrumentality of the suspending arm 12 of the gravity-actuator 13, the regulating valve may be automatically turned, under action of a thermostat indicated as a whole by the letter T and receiving water from the water-cooling system of the engine E. The thermostat illustrated in Figure 8 as suitable for this purpose comprises a cylinder 16 forming the outer jacket of the thermostat, and a flexible cord or cable 19, which is operatively connected with the thermostat, is also connected with the suspending arm 12.

Within the jacket is located a cylinder or casing 20 having a removable head 20a provided with a boss 20b, and the closed lower end of the casing has a complementary boss 20c. The jacket is also provided with a removable head 16a, and bolts 16b are employed to rigidly join the inner casing with the outer jacket.

Within the casing or cylinder 20 an expansible and contractible actuator of the accordion plaited type is indicated at 21, having spaced heads 21a and 21b, and this actuator expands (as shown in Figure 8) under influence of heated water within the casing to open the regulating valve, and contracts to close the valve, through suitable lever mechanism and the cord 19.

A stem 22 on the actuator 21 passes through a central hole in a horizontal interior partition 23 of the casing, and at 22a the stem is pivotally connected to the short arm of a lever 24, pivoted at 25 within the walls of the casing.

The long arm of the thermostat lever 24 projects through complementary slots 26 and 27 of the casing and jacket respectively, and to the head 28 on the exterior end of the lever, the rear end of the flexible cord or cable 19 is connected. A spring 29 is coiled about the lever with its inner end secured thereto, and the outer end of this spring bears against a closure plate 30, within the jacket, to close the slot 27. The plate is provided with a hole through which the lever projects, and the plate slides up and down with the lever as the latter is actuated by the thermostat to operate the regulating valve.

In Figure 6 where a modified form of the invention is illustrated, both the regulating valve and the feed control valve are automatically operated, the former under gravity through the pendulum, and the latter through motive fluid pressure, as suction from the engine E through the carbureter C'. In this form of the invention the air control device, as a whole, extends transversely of the engine, but the gravity actuator or pendulum swings parallel with the direction of travel of the vehicle.

The valve casing or cylinder 30a has its inner end threaded directly into a boss of the carbureter C' and the casing projects laterally of the carbureter, the outer end portion of the casing having a somewhat enlarged bore, and being provided with an air port 30b. A spacing sleeve 31a surrounds the inner end 30a of the casing, while the outer end 31 having the enlarged bore and the port 30b is surrounded by the rotary regulating valve 32. The regulating valve is fashioned with a port 32a complementary to and co-acting with the inner port 30b of the valve casing 31. In addition to the regulating port 32a and feed control port 30b I may use a supplemental pair of complementary ports 31b in the valve casing and 32b in the regulating valve, as best seen in Figure 7.

The gravity-actuator, as seen in Figures 6 and 7 is rigidly connected directly to the regulating valve by means of the suspending arm 33 threaded into a hole in the regulating valve, and the pendulum 34 is adjustably mounted on the free end of the suspending arm 33.

At its outer end, the regulating valve is retained against displacement by means of a collar 35, and the threaded cap 36, having port 36a and it will be understood that the sleeve 31a and the collar 35 may be replaced by complementary members of different lengths, to vary the relation of the slotted regulating valve to the feed control port of the valve casing.

The automatically operated feed control, or slide valve 37 is adapted to reciprocate within its casing 31 to vary the area of the opening of the port 30b, and a bumper or shock absorber 38 with a cushion 39 is located in the outer end of the valve casing to cushion the impact of the valve or piston. Passage 36a extends through cap 36 and bumper 38 and cushion 39 to allow atmospheric pressure to operate against the outer end of valve 37.

The valve 37 is moved automatically to closed or partially closed position under action of suction from the engine, and the valve is opened through tension of a spring 40 that is interposed between the valve and an open nut or plug 41 having an orifice that is threaded in the attaching end of the pipe 31a that forms the valve casing.

While I have described the air control device as an attachment for a carbureter, it will be understood that the device of my invention may be utilized as the sole means for supplying air to the fuel mixture that is fed to the internal combustion engine, and the air is admitted to the fuel mixture in a gradually increasing, or diminishing, amount, in accord with the movement of the accelerator. The available supply of air for the feed control is regulated in accordance with the operating conditions existing at various periods of time when the vehicle is traveling, as for instance, in ascending and in descending grades in the road or highway.

Of the regulated supply of air from the atmosphere, only approximately that percentage of regulated volume is fed by the feed control valve which equals, approximately, the percentage that the accelerator has been moved, of its total amount. As the movement of the accelerator controls the speed of the engine, it follows that the feed control valve feeds the available supply of atmosphere also with relation to the speed of the engine, while the regulating valve varies the volume of available air in accord with operating conditions. Thus, the gravity actuator or pendulum regulates the volume of available air supplied to the feed control valve, supplying an increasing volume when the vehicle is descending a hill, and on the other hand decreasing the volume of available air when the vehicle is ascending a hill.

The manual control indicated at 17 may also be used to regulate the volume of available air supplied to the feed control valve, and as before stated this control may be set to limit the automatic control of the regulating valve through the pendulum.

The thermostatic control illustrated, through the connection of the cord 19 to the suspending arm of the gravity actuator, may be utilized to limit the swing of the gravity-actuator and turning of the regulating valve, until such time that the engine has heated the water in the cooling system, after which a larger volume of air may be supplied to the feed control valve by the regulating valve for use in the fuel mixture.

As is well known, there is an air ratio for any given degree of inclination or declination of the vehicle and engine which, if increased or decreased, will cause less economical operation of the engine, and this ratio varies in accord with the degree of inclination or declination, until we reach a maximum or a minimum beyond which the engine will not operate with more economy, nor with more power, regardless of the grade of the hill. For instance, after we have determined the best operating fuel mixture at 30 miles per hour on the level, to add to, or to decrease, the fuel in the mixture merely causes loss of mileage at that speed on the level, and consequently of gasoline, while thus operating at 30 miles per hour on level roads. However, if we increase the load of vehicle, or work against a slightly tight brake, then, a richer mixture is the more economical mixture. In such an instance, manual control of the rod 17 at the dash, and automatic operation of the regulating valve, adapts the volume of air from the atmosphere to the feed control valve.

Having thus fully described my invention, what I claim as new and desire to secure by Letters Patent is:—

1. In an air control device for internal combustion engines having operating control mechanism the combination with a ported valve casing, of a regulating valve co-acting with said ported casing, a gravity-actuator for operating said regulating valve, a feed control valve within the valve casing, and means for causing the position of said feed control valve to be varied as a result of operating said operating control mechanism to vary the speed of the engine.

2. In an air control device for internal combustion engines, the combination with a ported valve casing, a feed control slide-valve therein and means for operating said valve, of an exterior rotary regulating valve having porting for co-action with said ported casing, gravity actuated means for operating the regulating valve, manually operated means for controlling the gravity-actuated-means, and thermostatically operated means for controlling the gravity-actuated-means.

3. The combination with a carburetor for internal combustion engines having operating control mechanism, of an auxiliary air supply mechanism including a ported valve casing, an exterior regulating valve co-acting with said casing and gravity-actuated means for operating the valve, a feed control valve within the ported casing, and means for causing the position of said feed control valve to be varied as a result of operating said operating control mechanism to vary the speed of the engine.

4. The combination with a carbureter for internal combustion engines having operating control mechanism, of an auxiliary air supply mechanism including a ported valve casing, an exterior, ported rotary valve and a pendulum suspended therefrom, a slide valve within the ported valve casing, and means for causing the position of said slide valve to be varied as a result of operating said operating control mechanism to vary the speed of the engine.

5. The combination with a carbureter for internal combustion engines having operating control mechanism, of an auxiliary supply mechanism including a ported valve casing, a circumferentially adjustable support on the casing and a pendulum suspended from said support, an exterior ported rotary valve mounted on the ported valve casing and operating connections between said pendulum and the rotary valve, a slide valve within the valve casing, and means for causing the position of said slide valve to be varied as a result of operating said operating control mechanism to vary the speed of the engine.

6. In a control device for varying the volume of air supplied to the fuel mixture of an internal combustion engine having a throttle control, the combination of means for varying in accordance with the inclination of the engine the capacity of the device for the admission of air, other means for varying the admission of air in series with the first named means, and operative connections from said throttle control to said other means.

7. In a control device for varying the volume of air supplied to the fuel mixture of an internal combustion engine, the combination of means for varying in accordance with the inclination of the engine the capacity of the device for the admission of air, thermostatically operated means for varying said capacity, manual means for varying said capacity, and other means for varying the admission of air during operation under any capacity for the admission of air produced by the aforesaid means for varying the capacity of the device.

8. In a carbureter for internal combustion engines having air and fuel mixing means and a throttle control for controlling the feeding of the fuel mixture to the engine, the inclusion of an auxiliary air supply mechanism having capacity control means for varying in accordance with the inclination of the engine the capacity of the carbureter for the admission of air, other means for varying the admission of air in series with the capacity control means, and operative connections from the throttle control for operation of said other means.

9. In an air control device for internal combustion engines having speed control mechanism, the combination with a ported valve casing, a feed control slide-valve therein, and operative connections with the speed control mechanism for operating said valve, of an exterior rotary regulating valve having porting for co-action with said ported casing, gravity actuated means for operating the regulating valve, and manually operated means for controlling the gravity-actuated means.

10. In an air control device for a vehicle employing an internal combustion engine having operating control mechanism, the combination with means for regulating the available supply of air from the atmosphere in accord with the inclination of the vehicle, of feed control means for varying in series with the first named means the supply of the available air to the fuel mixture, and means responsive to said operating control mechanism to control said feed control means.

11. In a control device for varying the volume of air supplied to the fuel mixture of an internal combustion engine having operating control mechanism, the combination with means for varying in accordance with the inclination of the engine the capacity of the device for the admission of air, of other means responsive to said operating control mechanism for varying the admission of air in series with the first named means.

12. In a control device for varying the volume of air supplied to the fuel mixture of an internal combustion engine, the combination with means for varying in accordance with the inclination of the engine the capacity of the device for the admission of air, and means for varying said capacity controlled by the temperature of the engine, of other means, operated independently of the operation of the first named means, for varying the admission of air during operation under any capacity for the admission of air produced by the aforesaid means for varying the capacity of the device.

13. In a control device for varying the volume of air to the fuel mixture of an internal combustion engine having operating control mechanism, the combination with means for varying in accordance with the inclination of the engine the capacity of the device for the admission of air, and manual means for varying said capacity, of other means responsive to said operating control mechanism for varying the admission of air in series with the first named means.

14. In a device for admitting air to the fuel mixture of internal combustion engines having a throttle and throttle control, the combination of a ported valve casing, a slide valve within the casing, a sleeve valve on the casing, operative connections between one of said valves and said throttle control for opening and closing the casing porting, and means for operating the other of said valves to open and close the casing porting transversely to the direction of movement of the valve operated by connections with the throttle.

15. In a device for admitting air to the fuel mixture of internal combustion engines having operating control mechanism, the combination of a ported valve casing, a slide valve within the casing, a sleeve valve on the casing, means for causing the position of one of the said valves to be varied, as a result of operating said operating control mechanism to vary the speed of the engine, for opening and closing the casing porting, and means for operating the other of said valves to open and close the casing porting transversely to the direction of movement of the valve the position of which is caused to be varied by operation of said operating control mechanism.

16. In a control device for varying the volume of air supplied to the fuel mixture of internal combustion engines having operating control mechanism, the combination with a ported valve casing, of a regulating valve for opening and closing the porting of the casing from one side of the casing, a feed control valve for opening and closing said porting from the other side of the casing, gravity actuated means for operating said regulating valve, and means for causing the position of said feed control valve to be varied as a result of operating said operating control mechanism to vary the speed of the engine.

17. In a control device for varying the volume of air supplied to the fuel mixture of internal combustion engines, the combination with a ported valve casing, of a regulating valve for opening and closing the porting of the casing from one side of the casing, a feed control valve for opening and closing said porting from the other side of the casing, gravity-actuated means for operating said regulating valve, said feed control valve being movable in one direction by fluid pressure, and resilient means for moving said feed control valve in the reverse direction.

18. In a control device for varying the volume of air supplied for the fuel mixture of internal combustion engines having a throttle control, the combination of means for the admission of air, gravity controlled means for varying the admission of air through the first named means, and throttle controlled means for varying the admission of air through said first named means in series with said gravity controlled means.

19. In a device for varying the volume of air supplied for the fuel mixture of internal combustion engines having a throttle control, the combination of means for the admission of air, gravity controlled means for varying the admission of air through the first named means, and means responsive to the operation of said throttle control for varying the admission of air through said first named means in series with said gravity controlled means.

RUFUS B. FUNK.